United States Patent
Ka et al.

(10) Patent No.: US 12,255,349 B2
(45) Date of Patent: Mar. 18, 2025

(54) SEPARATOR FOR SECONDARY BATTERY HAVING EXCELLENT ELECTROLYTE IMPREGNATION

(71) Applicant: LG ENERGY SOLUTION, LTD., Seoul (KR)

(72) Inventors: Kyung Ryun Ka, Daejeon (KR); Sang Joon Lee, Daejeon (KR); In Hyouk Sung, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 534 days.

(21) Appl. No.: 17/623,532

(22) PCT Filed: Sep. 2, 2020

(86) PCT No.: PCT/KR2020/011799
§ 371 (c)(1),
(2) Date: Dec. 28, 2021

(87) PCT Pub. No.: WO2021/049812
PCT Pub. Date: Mar. 18, 2021

(65) Prior Publication Data
US 2022/0416361 A1 Dec. 29, 2022

(30) Foreign Application Priority Data
Sep. 11, 2019 (KR) .................. 10-2019-0112581

(51) Int. Cl.
*H01M 50/42* (2021.01)
*C09D 133/08* (2006.01)
(Continued)

(52) U.S. Cl.
CPC .......... *H01M 50/42* (2021.01); *C09D 133/08* (2013.01); *H01M 50/446* (2021.01); *H01M 50/449* (2021.01)

(58) Field of Classification Search
CPC .......... C09D 133/08; H01M 10/0525; H01M 50/403; H01M 50/411; H01M 50/42; H01M 50/446; H01M 50/449; Y02E 60/10
See application file for complete search history.

(56) References Cited

U.S. PATENT DOCUMENTS

2013/0224552 A1  8/2013 Hong et al.
2013/0330590 A1  12/2013 Toyoda
(Continued)

FOREIGN PATENT DOCUMENTS

CN  101667662 A  3/2010
CN  105917502 A  8/2016
(Continued)

OTHER PUBLICATIONS

Machine Translation CN109411679A (Year: 2019).*
(Continued)

*Primary Examiner* — Victoria H Lynch
(74) *Attorney, Agent, or Firm* — Birch, Stewart, Kolasch & Birch, LLP

(57) ABSTRACT

A separator for a secondary battery having a separator substrate and a coating layer formed on the separator substrate. The coating layer is on at least one surface of the separator substrate. The coating layer comprises an acrylate-based binder and an additive. The additive is a fluorine-based non-ionic surfactant, and provides a separator for a secondary battery with significantly improved electrolyte impregnation rate.

9 Claims, 7 Drawing Sheets

(51) Int. Cl.
  *H01M 50/446* (2021.01)
  *H01M 50/449* (2021.01)

(56) References Cited

U.S. PATENT DOCUMENTS

| | | |
|---|---|---|
| 2016/0164060 A1 | 6/2016 | Zhang et al. |
| 2016/0197327 A1 | 7/2016 | Li et al. |
| 2016/0268633 A1 | 9/2016 | Schofield et al. |
| 2016/0329541 A1 | 11/2016 | Adams et al. |
| 2017/0331094 A1 | 11/2017 | Lee et al. |
| 2019/0103593 A1 | 4/2019 | Kai et al. |

FOREIGN PATENT DOCUMENTS

| | | |
|---|---|---|
| CN | 106463676 A | 2/2017 |
| CN | 106997940 A | 8/2017 |
| CN | 107083694 A | 8/2017 |
| CN | 107528038 A | 12/2017 |
| CN | 109244322 A | 1/2019 |
| CN | 109411679 A | 3/2019 |
| JP | 2000-149945 A | 5/2000 |
| JP | 2002-33124 A | 1/2002 |
| JP | 5846449 B2 | 1/2016 |
| JP | 2017-538248 A | 12/2017 |
| JP | 2019-54004 A | 4/2019 |
| JP | 6506369 B2 | 4/2019 |
| KR | 10-2007-0077231 A | 7/2007 |
| KR | 10-2010-0084030 A | 7/2010 |
| KR | 10-1488918 B1 | 2/2015 |
| KR | 10-2017-0022977 A | 3/2017 |
| KR | 10-2017-0091149 A | 8/2017 |
| KR | 10-1820459 B1 | 1/2018 |
| WO | WO 2016/002637 A1 | 1/2016 |
| WO | WO 2017/169845 A1 | 10/2017 |

OTHER PUBLICATIONS

International Search Report for PCT/KR2020/011799 mailed on Dec. 4, 2020.
Extended European Search Report for European Application No. 20863399.0 dated Jul. 27, 2022.

* cited by examiner

[FIG. 1]
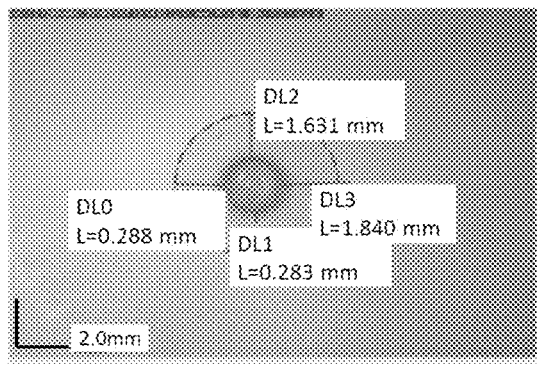
[Example 1]
Average diffusion distance: 1.78 mm
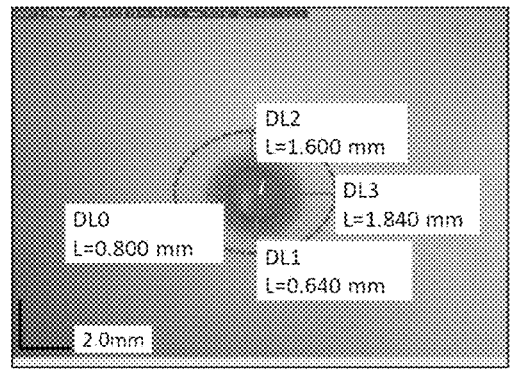
[Example 2]
Average diffusion distance: 1.71 mm
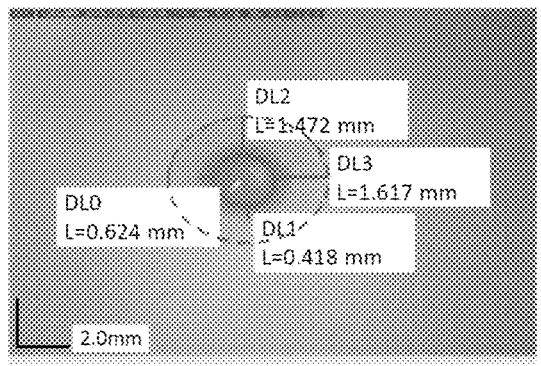
[Example 3]
Average diffusion distance: 1.51 mm
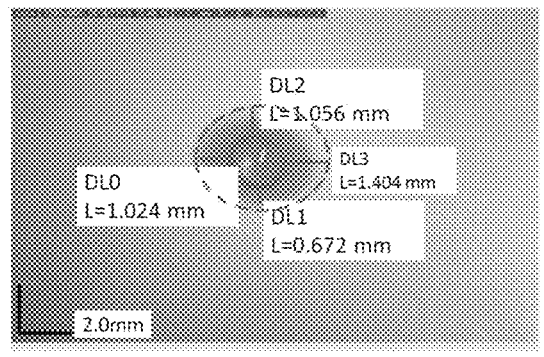
[Comparative Example 1]
Average diffusion distance: 1.2 mm
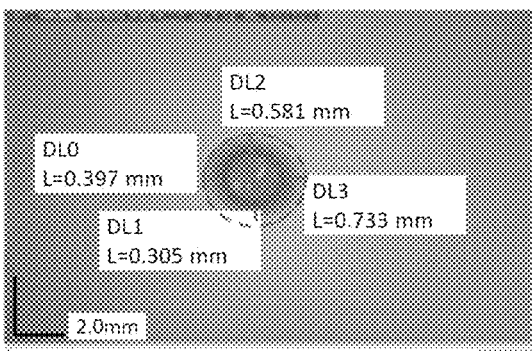
[Comparative Example 2]
Average diffusion distance: 0.62 mm

[FIG. 2]
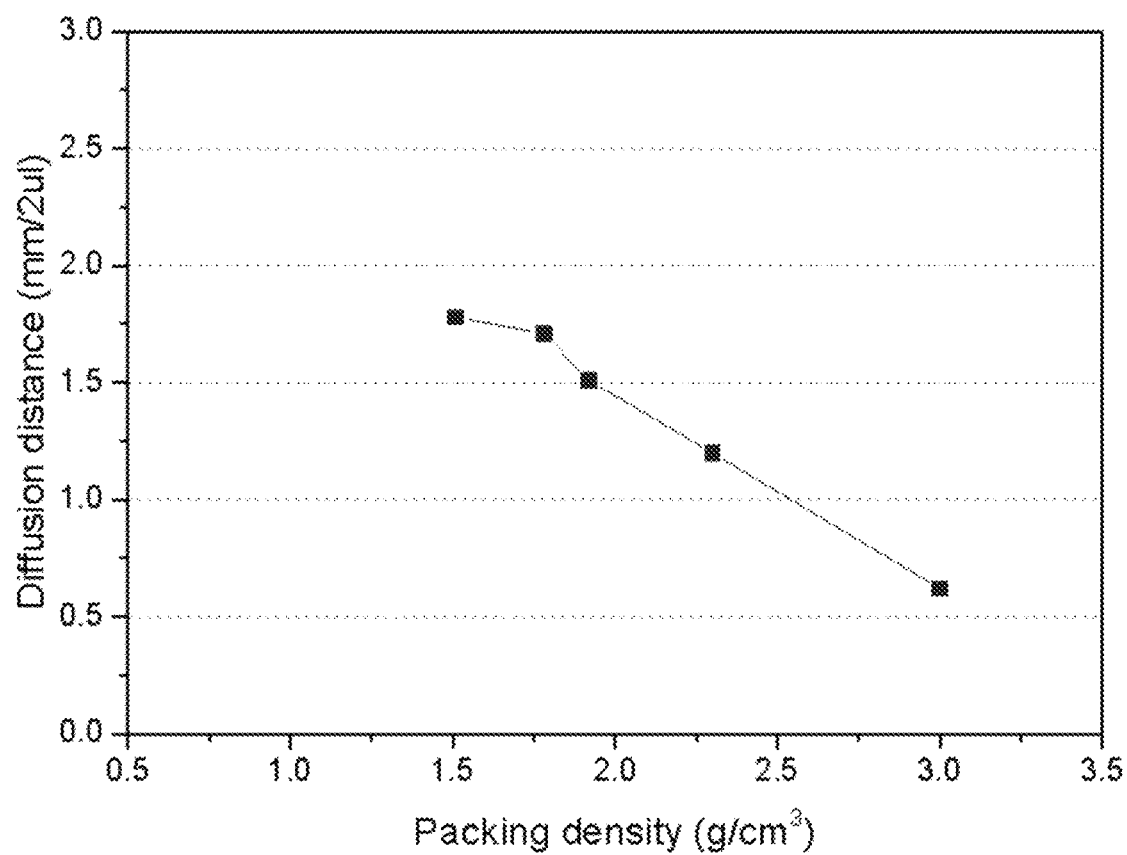

[FIG. 3]
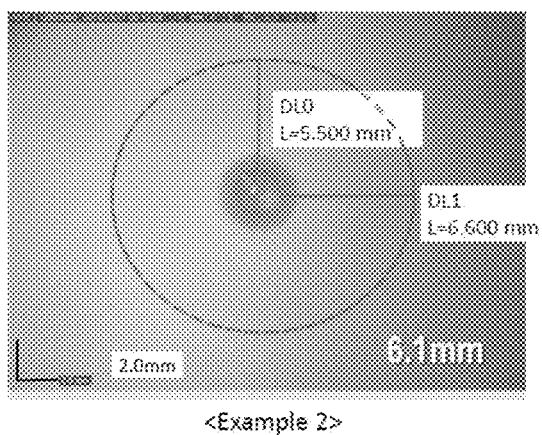
<Example 2>
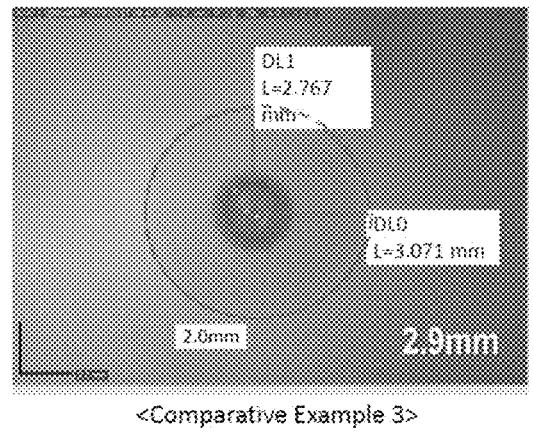
<Comparative Example 3>
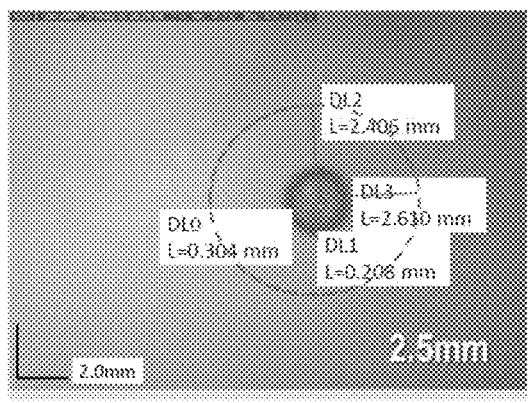
<Comparative Example 4>
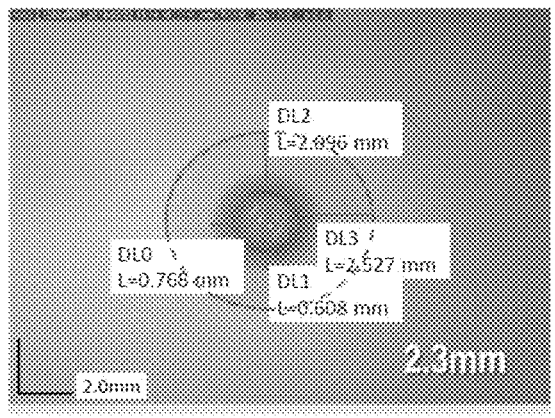
<Comparative Example 5>

[FIG. 4]
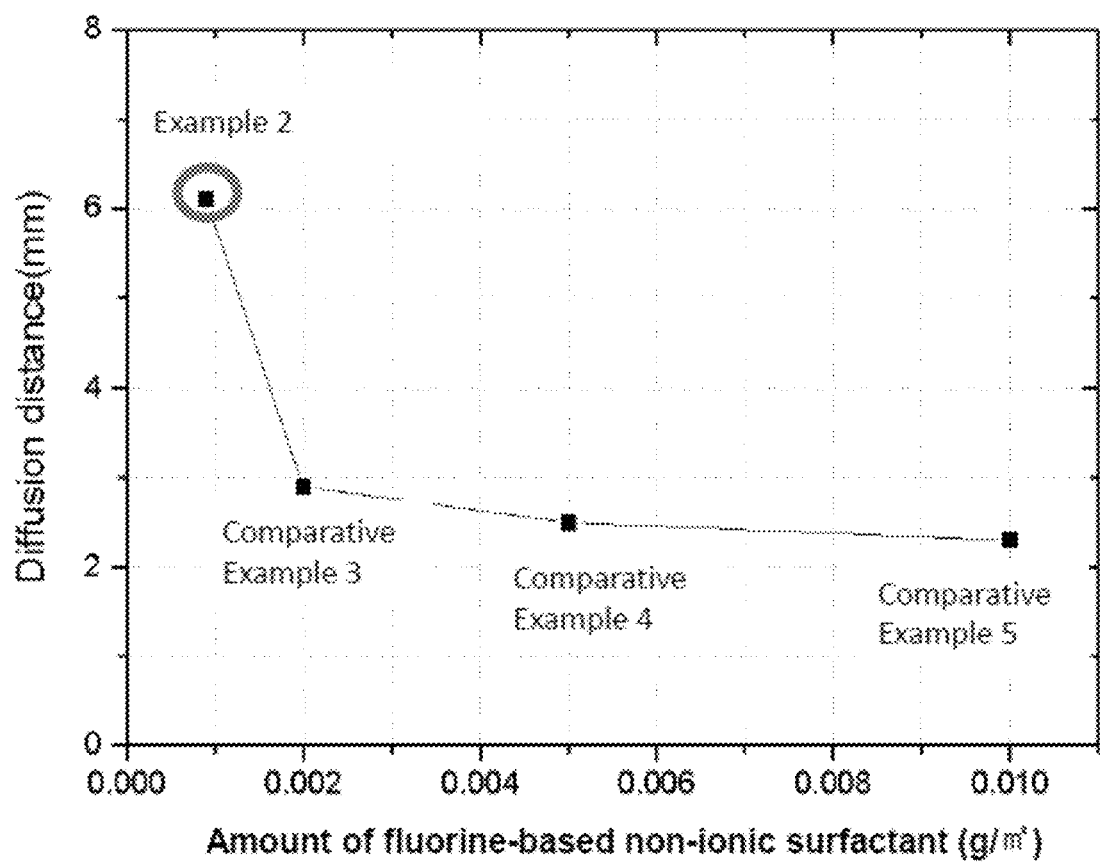

[FIG. 5]
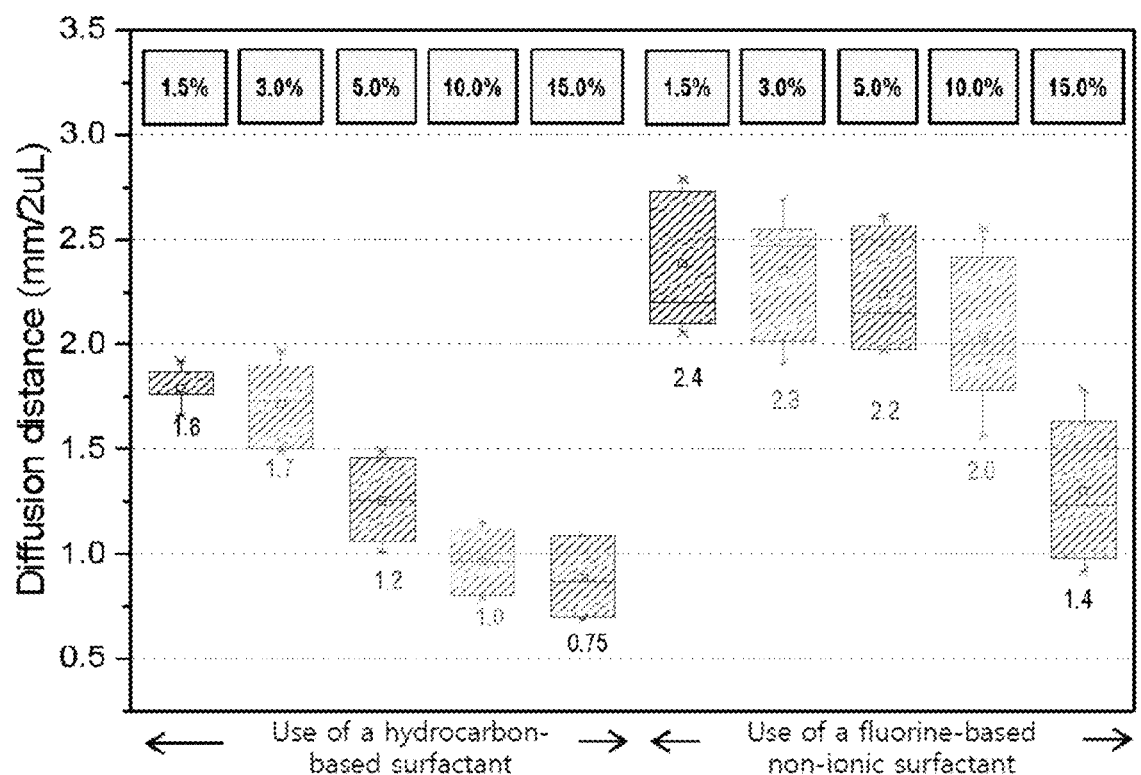

【FIG. 6】
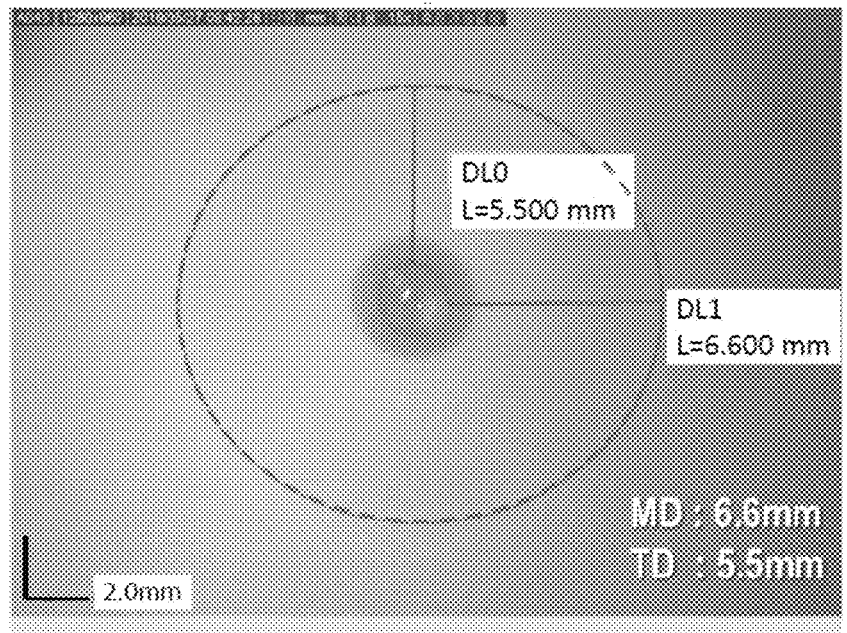
<Example 2>
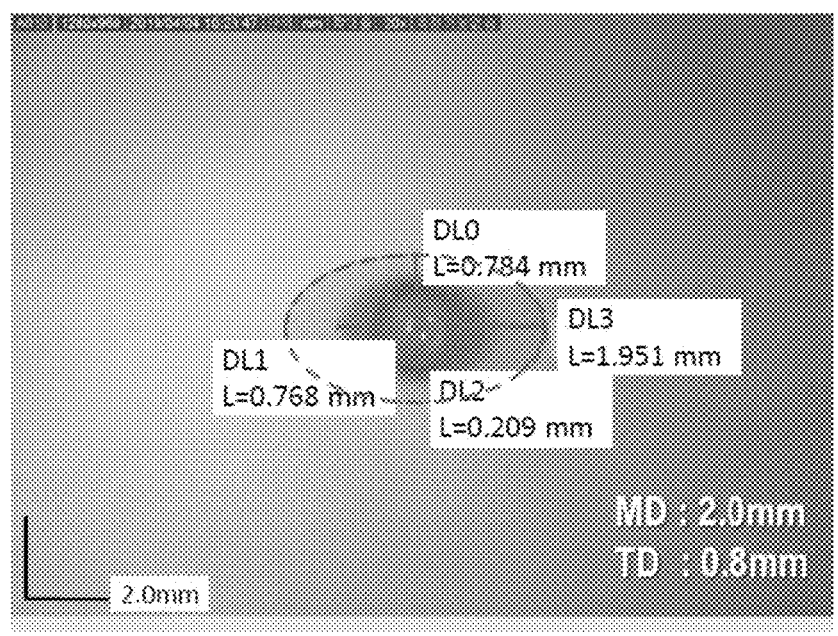
<Comparative Example 6>

[FIG. 7]
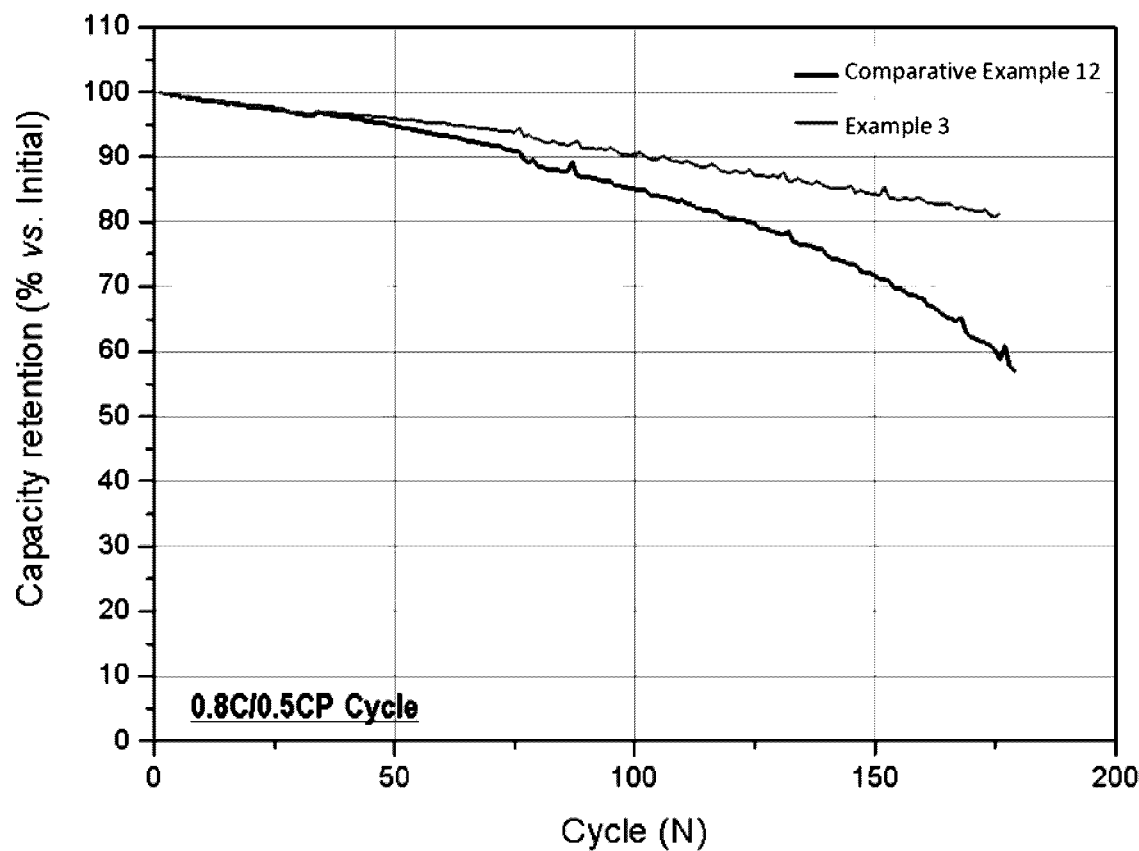

SEPARATOR FOR SECONDARY BATTERY HAVING EXCELLENT ELECTROLYTE IMPREGNATION

TECHNICAL FIELD

This application claims the benefit of priority to Korean Patent Application No. 2019-0112581 filed on Sep. 11, 2019, the disclosure of which is hereby incorporated by reference herein its entirety.

The present invention relates to a separator for a secondary battery having excellent electrolyte impregnation, and relates to a separator in which the electrolyte impregnation of the separator is improved by including a minimum amount of a key element negatively affecting the electrolyte impregnation of the separator and maximizing the porosity of a separator coating layer.

BACKGROUND ART

Among the separators of lithium secondary batteries, a safety reinforced separator (SRS) with improved safety is widely used. The SRS separator is configured such that a coating layer including an inorganic material and a binder is formed on a polyolefin-based substrate. The SRS separator provides high safety against high temperatures by forming the coating layer on the polyolefin-based substrate to complement the polyolefin-based substrate, which is vulnerable to heat.

The coating layer of the SRS separator has a porous structure by the inorganic material and the binder. A volume in which a liquid electrolyte solution is placed is increased by virtue of the porous structure, thereby improving lithium ion conductivity and an electrolyte impregnation rate of the SRS separator.

The electrolyte impregnation rate is a very important factor affecting the lifespan and capacity of a battery, and the higher the electrolyte impregnation rate, the more advantageous.

Patent Document 1 relates to a separator for a non-aqueous secondary battery in which output characteristics are improved by reducing internal resistance of a battery. The separator includes a fluorine-containing non-ionic surfactant having a hydrophilic structural unit and a hydrophobic structural unit containing a fluorine atom. The amount of the fluorine-containing non-ionic surfactant is 0.001 wt % or more and 1 g/m² or less.

Patent Document 2 relates to a separator having a relatively slim thickness, high peel strength and high adhesion to electrodes. Patent Document 2 used polyvinylidene fluoride homopolymer having a weight average molecular weight of 1 million g/mol or more and inorganic particles having an average particle size of 1 nm to 700 nm as a coating agent, and adjusted the density of the separator to 1.2 g/m³ to 2 g/m³.

Patent Document 3 provides a separator with excellent dispersibility, in which an inorganic material mixture including inorganic particles, a dispersant, and a binder is applied on a porous substrate. The dispersant is a copolymer comprising an ionic main chain and a non-ionic surface-active side chain.

The above patent documents do not disclose specific details for improving the impregnation property of the separator while minimizing the addition of a surfactant.

Prior Art Documents (Patent Document 1) Korean Patent Application Publication No. 2017-0022977 (2017 Mar. 2)
(Patent Document 2) Korean Registered Patent No. 1488918 (2015 Feb. 3)
(Patent Document 3) Korean Registered Patent No. 1820459 (2018 Jan. 15)

DISCLOSURE

Technical Problem

The present invention has been made in view of the above problems, and it is an object of the present invention to provide a separator for a secondary battery in which a surfactant included in a slurry forming a coating layer of the separator is included only a very small amount and electrolyte impregnation is improved by using a certain amount of a binder.

Technical Solution

In accordance with the present invention, the above and other objects can be accomplished by the provision of a separator for a secondary battery having a separator substrate, and a coating layer on a separator substrate. The coating layer may be on at least one surface of the separator substrate, the coating layer may comprise an acrylate-based binder and an additive, and the additive may be a fluorine-based non-ionic surfactant.

An amount of the acrylate-based binder present may be 10 wt % or less based on a total weight of solid content in the coating layer excluding the additive.

Preferably, the amount of the acrylate-based binder present may be 5 wt % or less based on the total weight of solid content in the coating layer excluding the additive.

An amount of the fluorine-based non-ionic surfactant present may be 0.001 wt % or less based on a total of an inorganic material and the acrylate-based binder in the coating layer.

Alternatively, a density of the coating layer may be 2 g/m³ or less.

The separator may be an aqueous separator.

In the separator, a difference in diffusion distance of the electrolyte in each of a machine direction (MD) and a transverse direction (TD) may be within a range of 1.5 times, when 2 μl of an electrolyte is dropped.

An average diffusion distance of the separator may be 2.0 mm/2 μl to 7.0 mm/2 μl.

The coating layer may further comprise an inorganic material.

The present invention also provides a battery cell comprising an electrode assembly in which the separator for a secondary battery is interposed between a positive electrode and a negative electrode.

When the battery cell is charged and discharged 150 times, a capacity retention rate of the battery cell may be 80% or more.

The present invention provides a battery pack comprising the battery cell and a device using the battery pack as an energy source.

Specific examples of the device are not particularly limited, and those commonly used widely in the art may be included therein.

BRIEF DESCRIPTION OF DRAWINGS

FIG. 1 is photographs showing differences in impregnation depending on a coating density.

FIG. 2 is a graph showing a diffusion distance depending on the coating density of the separators of FIG. 1.

FIG. 3 is photographs showing differences in impregnation depending on an amount of a fluorine-based non-ionic surfactant.

FIG. 4 is a graph showing a diffusion distance depending on the amount of the fluorine-based non-ionic surfactant in the separators of FIG. 3.

FIG. 5 is a graph showing electrolyte impregnation depending on an amount of a binder when using a fluorine-based non-ionic surfactant and electrolyte impregnation depending on an amount of a binder when using a hydrocarbon-based surfactant.

FIG. 6 is photographs comparing differences in impregnation of the separators of Example 2 and Comparative Example 6.

FIG. 7 is the results obtained by measuring cycle characteristics of battery cells.

BEST MODE

Hereinafter, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, in the present specification, limitations or additions to certain embodiments may be applied not only to specific embodiments, but also to other embodiments.

A separator for a secondary battery according to the present invention is configured to have a structure in which a coating layer is formed on at least one surface of a separator substrate, wherein the coating layer comprises an acrylate-based binder and a fluorine-based non-ionic surfactant as an additive.

The separator substrate may be a polyolefin-based separator commonly used in the art. For example, it may be made of at least one selected from the group consisting of high-density polyethylene, low-density polyethylene, linear low-density polyethylene, ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenyleneoxide, polyphenylenesulfidro, polyethylenenaphthalene, and a mixture thereof.

The binder may constitute a coating layer of a separator together with an inorganic material, and the binder may maintain bonding between inorganic particles and improve adhesion between an electrode and a separator.

The type of the binder is not particularly limited, as long as it does not cause any chemical change to the separator coating layer. For example, the binder may be polyolefin such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymer and ethylene-tetrafluoroethylene copolymer; styrene-butadiene copolymer and its hydride; (meth)acrylic acid ester copolymer such as methacrylic acid ester copolymer, acrylonitrile acrylic acid ester copolymer, and styrene acrylic acid ester copolymer; rubbers such as ethylene propylene rubber; polyvinyl acetate; resins having melting point or glass transition temperature of 180° C. or higher such as polyphenylene ether, polysulfone, polyether sulfone, polyphenylene sulfide, polyetherimide, polyamide, polyimide, polyamideimide, polyetheramide, polyester, aromatic polyester and polyetheretherketone; polycarbonate; polyacetal; and water-soluble resins such as carboxyalkyl cellulose, alkyl cellulose, hydroxyalkyl cellulose, starch, polyvinyl alcohol, sodium alginate, polyethylene glycol, cellulose ester, polyacrylic acid, polyacrylamide and polymethacrylic acid, or a polymer comprising at least two thereof.

In a concrete example, the binder may be an acrylate-based binder. In general, the acrylate-based binder may be used by copolymerizing a soft monomer having a low glass transition temperature (Tg) and a hard monomer having a high glass transition temperature at a predetermined ratio.

The acrylate-based binder is a component essentially included in the coating layer, and may be included in an amount of 10 wt % or less based on the total weight of the solid content excluding additives, and in particular, it may be included in an amount of 1 wt % to 5 wt % or less.

When the acrylate-based binder is not included, the bonding force with an electrode may be weakened, which is not preferable. When the acrylate-based binder is greater than wt %, the electrolyte impregnation may cause asymmetry depending on a direction, which is not preferable.

The separator for a secondary battery according to the present invention includes an additive in the coating layer, and the additive may be a fluorine-based non-ionic surfactant.

Various surfactants have been conventionally known. For example, there are a non-ionic surfactant having an alkyl group as a hydrophobic structural unit, a fluorine-based anionic surfactant containing sulfonate as a hydrophobic structural unit among fluorine-based surfactants having a fluorine atom as a hydrophobic structural unit, and an anionic surfactant such as a quaternary ammonium salt. However, these do not have the effect of lowering the internal resistance of the battery, but rather, there is a problem with the characteristic of increasing the internal resistance of the battery.

The fluorine-based non-ionic surfactant may be, for example, a fluoroalkylethylene oxide adduct, a fluoroalkenylethylene oxide adduct, a fluoroalkylpropylene oxide adduct, a fluoroalkenylpropylene oxide adduct, a perfluoroalkylethylene oxide adduct, and a perfluoroalkenylethylene oxide adduct.

The separator for a secondary battery according to the present invention includes 0.001 wt % or less of the fluorine-based non-ionic surfactant based on the total of the inorganic material and the acrylate-based binder in the coating layer. When the fluorine-based non-ionic surfactant is contained in an amount greater than 0.001 wt %, the electrolyte impregnation rate rapidly decreases, which is not preferable.

The separator for secondary batteries according to the present invention includes the coating layer having a density of 2 g/m³ or less. When the density of the coating layer is greater than 2 g/m³, the electrolyte impregnation rate rapidly decreases, which is not preferable.

The separator coating layer may further include an inorganic material, and the inorganic material may be at least one selected from the group consisting of $BaTiO_3$, $Pb(Zr,Ti)O_3(PZT)$, $Pb_{1-x}La_xZr_{1-y}Ti_yO_3(PLZT)$ ($0<x<1$, $0<y<1$), $PB(Mg_{1/3}Nb_{2/3})O_3$—$PbTiO_3(PMN-PT)$, hafnia($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, $(LiAlTiP)_xO_y$ series glass ($0<x<4$, $0<y<13$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ series glass ($Li_xSi_yS_z$, $0<x<3$, $0<y<2$, $0<z<4$), $P_2S_5$ series glass ($Li_xP_yS_z$, $0<x<3$, $0<y<3$, $0<z<7$), and a mixture thereof, but the present invention is not limited thereto.

The present invention also provides a battery cell comprising an electrode assembly in which the separator for a secondary battery is interposed between a positive electrode and a negative electrode. The battery cell may be a lithium secondary battery configured to have a structure in which an electrode assembly is impregnated with a lithium salt-containing non-aqueous electrolyte.

The positive electrode may be manufactured by, for example, applying a positive electrode mixture comprising a positive electrode active material on a positive electrode current collector and drying the positive electrode mixture. The positive electrode mixture may optionally further comprise a binder, a conductive agent, a filler and the like, as needed.

In general, the positive electrode current collector is manufactured so as to have a thickness of 3 μm to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the adhesion force of the positive electrode active material. The current collector may be configured in various forms, such as those of a film, a sheet, a foil, a net, a porous body, a foam body, and a non-woven fabric body.

The positive electrode active material may be a material capable of undergoing electrochemical reaction, and comprise a lithium transition metal oxide, which contains two or more transition metals, for example, a layered compound such as lithium cobalt oxide ($LiCoO_2$) and lithium nickel oxide ($LiNiO_2$), which is substituted with one or more transition metals; lithium manganese oxide substituted with one or more transition metals; lithium nickel oxide represented by $LiNi_{1-y}M_yO_2$ (wherein M=Co, Mn, Al, Cu, Fe, Mg, B, Cr, Zn or Ga, the oxide contains at least one of these elements, and y satisfies $0.01 \le y \le 0.9$); lithium nickel cobalt manganese composite oxide represented by $Li_{1+z}Ni_bMn_cCo_{1-(b+c+d)}M_dO_{(2-e)}A_e$ (wherein $-0.5 \le z \le 0.5$, $0.1 \le b \le 0.8$, $0.1 \le c \le 0.8$, $0 \le d \le 0.2$, $0 \le e \le 0.2$, $b+c+d<1$, M=Al, Mg, Cr, Ti, Si or Y, and A=F, P or Cl) such as $Li_{1+z}Ni_{1/3}Co_{1/3}Mn_{1/3}O_2$ and $Li_{1+z}Ni_{0.4}Mn_{0.4}Co_{0.2}O_2$; olefin-based lithium metal phosphate represented by $Li_{1+x}M_{1-y}M'_yPO_{4-z}X_z$ (wherein M is a transition metal, preferably, Fe, Mn, Co or Ni, M'=Al, Mg or Ti, X=F, S or N, and $-0.5 \le x \le 0.5$, $0 \le y \le 0.5$, $0 \le z \le 0.1$), and so forth, without being particularly limited thereto.

The conductive agent is generally added so that the conductive agent accounts for 1 wt % to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive substances, such as polyphenylene derivatives, may be used as the conductive agent.

The binder is a component assisting in binding between an active material and a conductive agent and in binding with a current collector. The binder is generally added in an amount of 1 wt % to 30 wt % based on the total weight of the compound including the positive electrode active material. Examples of the binder may be polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of an electrode. There is no particular limit to the filler, as long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by, for example, coating a negative electrode mixture comprising a negative electrode active material on a negative electrode current collector and drying the coated negative electrode current collector. The negative electrode mixture may optionally further comprise the foregoing components such as the conductive agent, the binder, the filler and the like, as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of a negative electrode active material, in the same manner as the positive electrode current collector. The negative electrode current collector may be configured in various forms, such as those of a film, a sheet, a foil, a net, a porous body, a foam body, and a non-woven fabric body.

The negative electrode active material may include, for example, carbon such as non-graphitized carbon and graphite-based carbon; a metal composite oxide, such as $Li_xFe_2O_3$ ($0\leq x\leq1$), $Li_xWO_2$ ($0\leq x\leq1$), $Sn_xMe_{1-x}Me'_yO_z$ (Me=Mn, Fe, Pb, Ge; Me'=Al, B, P, Si, Group 1, 2 and 3 elements of the periodic table, halogen; $0<x\leq1$; $1\leq y\leq3$; $1\leq z\leq8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer, such as polyacetylene; or a Li—Co—Ni-based material.

The binder, the conductive agent, and components added as needed are the same as those described for the positive electrode.

In addition, other components such as a viscosity controlling agent and an adhesion promoter may be optionally further included or may be further included in a combination of two or more.

The viscosity controlling agent is a component for controlling the viscosity of an electrode mixture so as to facilitate mixing of the electrode mixture and coating thereof on a current collector and may be added in an amount of 30 wt % based on a total weight of a negative electrode mixture. Examples of the viscosity controlling agent include, without being limited to, carboxymethylcellulose and polyvinylidene fluoride.

The adhesion promoter is an auxiliary component added to enhance adhesion between an electrode active material and an electrode current collector and may be added in an amount of 10 wt % or less based on the amount of the binder. Examples of the adhesion promoter include, without being limited to, oxalic acid, adipic acid, formic acid, acrylic acid derivatives, and itaconic acid derivatives.

The separator is interposed between the positive electrode and the negative electrode and, as the separator, a thin insulation film having a high ion permeability and excellent mechanical strength is used. The separator typically has a pore diameter of 0.01 μm to 10 μm and a thickness of 5 μm to 300 μm. As the separator, a sheet or non-woven fabric made of olefin polymer such as polypropylene and/or glass fibers or polyethylene, which have chemical resistance and hydrophobicity, is used. When a solid electrolyte such as a polymer is used as an electrolyte, the solid electrolyte may also serve as a separator.

The lithium salt-containing non-aqueous electrolyte consists of a non-aqueous electrolyte and a lithium salt. As the non-aqueous electrolyte, a non-aqueous organic solvent, an organic solid electrolyte, an inorganic solid electrolyte, or the like may be used.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt used herein is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, low aliphatic carboxylic lithium, lithium 4-phenyl borate, imides, or the like.

Additionally, in order to improve charge-discharge properties and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethyleneglycol dialkyl ether, ammonium salts, pyrrole, 2-methoxy ethanol, aluminum trichloride, or the like, may be added to the electrolyte. If necessary, in order to impart non-flammability, the electrolyte may further include halogen-containing solvents such as carbon tetrachloride and ethylene trifluoride. Further, in order to improve high-temperature storage characteristics, the electrolyte may further include carbon dioxide gas. Fluoro-ethylene carbonate (FEC), propene sultone (PRS), and the like may be further included to the electrolyte.

In one preferred embodiment, a lithium salt such as $LiPF_6$, $LiClO_4$, $LiBF_4$, $LiN(SO_2CF_3)_2$ and the like may be added to a mixture of cyclic carbonate of EC or PC as a high dielectric solvent and linear carbonate of DEC, DMC or EMC as a low viscosity solvent, to prepare a lithium salt-containing non-aqueous electrolyte.

The present invention also provides a battery pack including the secondary battery as a unit cell, and provides a device including the battery pack.

Specific examples of the device may be a small device including a computer, a mobile phone, and a power tool, and a medium- and large-sized device including a power tool driven by a battery-powered motor; an electric vehicle including an electric vehicle (EV), a hybrid electric vehicle (HEV), and a plug-in hybrid electric vehicle (PHEV); an electric two-wheeled vehicle including an electric bicycles (E-bike) and an electric scooter (E-scooter); an electric golf cart; and an electric power storage system. However, the present invention is not limited thereto.

The structure and manufacturing method of the battery pack and the device are well known in the art to which the present invention pertains, and a detailed description thereof will be omitted.

Hereinafter, the present invention will be described with reference to the following examples. These examples are provided only for illustration of the present invention and should not be construed as limiting the scope of the present invention.

Example 1

In order to prepare a coating agent for a separator coating layer, 97 wt % of $Al_2O_3$ as an inorganic material, 3 wt % of SG-L02 from GL Chem as an acrylate-based binder, and 0.001 wt % of FC4430 from 3M as a fluorine-based non-ionic surfactant, when the total amount of the inorganic material and the acrylate-based binder was 100 wt %, were added to water as a solvent and stirred to prepare a coating agent.

The coating agent was coated on both surfaces of a separator substrate made of a polyethylene porous material having a thickness of 9 μm so as to have a coating layer density of 1.5 g/m$^3$, and dried to manufacture a separator.

Example 2

A separator was manufactured in the same manner as in Example 1, except that the coating layer density of 1.8 g/m$^3$ was coated instead of 1.5 g/m$^3$ in Example 1.

Example 3

A separator was manufactured in the same manner as in Example 1, except that the coating layer density of 1.9 g/m$^3$ was coated instead of 1.5 g/m$^3$ in Example 1.

Comparative Example 1

A separator was manufactured in the same manner as in Example 1, except that the coating layer density of 2.3 g/m$^3$ was coated instead of 1.5 g/m$^3$ in Example 1.

Comparative Example 2

A separator was manufactured in the same manner as in Example 1, except that the coating layer density of 3.0 g/m$^3$ was coated instead of 1.5 g/m$^3$ in Example 1.

Comparative Example 3

A separator was manufactured in the same manner as in Example 3, except that 0.002 wt % of the fluorine-based non-ionic surfactant was used instead of 0.001 wt % of the fluorine-based non-ionic surfactant in Example 3.

Comparative Example 4

A separator was manufactured in the same manner as in Example 3, except that 0.005 wt % of the fluorine-based non-ionic surfactant was used instead of 0.001 wt % of the fluorine-based non-ionic surfactant in Example 3.

Comparative Example 5

A separator was manufactured in the same manner as in Example 3, except that 0.01 wt % of the fluorine-based non-ionic surfactant was used instead of 0.001 wt % of the fluorine-based non-ionic surfactant in Example 3.

Example 4

A separator was manufactured in the same manner as in Example 3, except that 1.5 wt % of the binder was used instead of 3 wt % of the binder in Example 3.

Example 5

A separator was manufactured in the same manner as in Example 3, except that 5 wt % of the binder was used instead of 3 wt % of the binder in Example 3.

Example 6

A separator was manufactured in the same manner as in Example 3, except that 10 wt % of the binder was used instead of 3 wt % of the binder in Example 3.

Comparative Example 6

A separator was manufactured in the same manner as in Example 3, except that 15 wt % of the binder was used instead of 3 wt % of the binder in Example 3.

Comparative Example 7

A separator was manufactured in the same manner as in Example 4, except that a hydrocarbon-based surfactant was used instead of the fluorine-based nonionic surfactant in Example 4.

Comparative Example 8

A separator was manufactured in the same manner as in Example 3, except that a hydrocarbon-based surfactant was used instead of the fluorine-based nonionic surfactant in Example 3.

Comparative Example 9

A separator was manufactured in the same manner as in Example 5, except that a hydrocarbon-based surfactant was used instead of the fluorine-based nonionic surfactant in Example 5.

Comparative Example 10

A separator was manufactured in the same manner as in Example 6, except that a hydrocarbon-based surfactant was used instead of the fluorine-based nonionic surfactant in Example 6.

Comparative Example 11

A separator was manufactured in the same manner as in Comparative Example 6, except that a hydrocarbon-based surfactant was used instead of the fluorine-based nonionic surfactant in Comparative Example 6.

Comparative Example 12

A separator was manufactured in the same manner as in Example 3, except that 15 wt % of the binder was used instead of 3 wt % of the binder in Example 3, and the coating layer density of 2.9 g/m$^3$ was coated instead of 1.9 g/m$^3$ in Example 3.

Experimental Example 1

Electrolyte Impregnation

A digital optical microscope (AD7013MZT(R4) of AnMo electronics corporation) and a steel ruler are prepared, and a focus is set by adjusting a height of the digital optical microscope so as to match the scale bar of the digital optical microscope and the measured value of the steel ruler.

The separators prepared in Examples and Comparative Examples were cut into a width of 50 mm in width and a length of 50 mm, placed on a slide glass, and an adhesive tape was attached to each vertex to fix the separator on the slide glass.

A 10 µl micro syringe was filled with 2 µl of propylene carbonate, a droplet was produced and dropped it onto the separator.

Immediately after dropping, a capture button was pressed to check a shape of the droplet, and an additional capture was done after 5 minutes.

The diffusion distance of the droplet dropped on the separator was measured in the MD direction and the TD direction.

The amounts of each component in Examples and Comparative Examples are summarized in Table 1 below.

TABLE 1

|  | Type of surfactant | Surfactant (wt %) | Binder (wt %) | Coating layer density (g/m³) |
|---|---|---|---|---|
| Example 1 | Fluorine-based | 0.001 | 3 | 1.5 |
| Example 2 |  | 0.001 | 3 | 1.3 |
| Example 3 |  | 0.001 | 3 | 1.9 |
| Comparative Example 1 |  | 0.001 | 3 | 2.3 |
| Comparative Example 2 |  | 0.001 | 3 | 3.0 |
| Comparative Example 3 |  | 0.002 | 3 | 1.9 |
| Comparative Example 4 |  | 0.005 | 3 | 1.9 |
| Comparative Example 5 |  | 0.01 | 3 | 1.9 |
| Example 4 |  | 0.001 | 1.5 | 1.9 |
| Example 5 |  | 0.001 | 5 | 1.9 |
| Example 6 |  | 0.001 | 10 | 1.9 |
| Comparative Example 6 |  | 0.001 | 15 | 1.9 |
| Comparative Example 7 | Hydrocarbon-based | 0.001 | 1.5 | 1.9 |
| Comparative Example 8 |  | 0.001 | 3 | 1.9 |
| Comparative Example 9 |  | 0.001 | 5 | 1.9 |
| Comparative Example 10 |  | 0.001 | 10 | 1.9 |
| Comparative Example 11 |  | 0.001 | 15 | 1.9 |
| Comparative Example 12 |  | 0.001 | 15 | 2.9 |

FIG. 1 is photographs of measuring a diffusion distance of the electrolyte for the separators of Examples 1 to 3 and Comparative Examples 1 and 2 in order to show the difference in impregnation depending on a coating density of the separator coating layer, and FIG. 2 is a graph showing a diffusion distance depending on the coating density of the separators of FIG. 1.

Referring to FIGS. 1 and 2, the diffusion distance of Example 1, which has the lowest coating layer density, was measured to be the longest, and the diffusion distance of Comparative Example 2, which has the highest coating layer density, was measured to be the shortest.

In particular, Examples 1 to 3 having the coating layer density of less than 2 g/m³ exhibit the diffusion distance of 1.5 mm/2 µl or more, and it can be seen that impregnation improves as the coating density decreases.

In order to confirm the electrolyte impregnation depending on the amount of the surfactant, the diffusion distance was measured using each of the separators prepared in Example 2 and Comparative Examples 3 to 5, and photographs thereof are shown in FIG. 3, and a graph showing the diffusion distance depending on the amount of the fluorine-based non-ionic surfactant is shown in FIG. 4.

Referring to FIGS. 3 and 4, the diffusion distance of 6.1 mm was shown in the case of Example 2 in which 0.001 wt % of the fluorine-based non-ionic surfactant was used, whereas the separators of Comparative Examples 3 to 5 in which the amount of the fluorine-based non-ionic surfactant was greater than 0.002 g/m² showed a result of less than 50% of the diffusion distance of the separator of Example 2.

Therefore, it can be seen that the electrolyte impregnation is significantly improved when the fluorine-based non-ionic surfactant is included in an amount of 0.001 wt % or less.

FIG. 5 is a graph showing electrolyte impregnation depending on an amount of a binder when using a fluorine-based non-ionic surfactant and electrolyte impregnation depending on an amount of a binder content when using a hydrocarbon-based surfactant.

Referring to FIG. 5, when the hydrocarbon-based surfactant is used, it is shown that the diffusion distance is less than 2 mm/2 µl regardless of the amount of the binder, whereas when the fluorine-based non-ionic surfactant is used, it is shown that the diffusion distance is 2 mm/2 µl or more if the amount of the binder is less than 10.0 wt %.

However, even when the fluorine-based non-ionic surfactant is used, the diffusion distance of 1.4 mm/2 µl is shown when 15.0 wt % of the binder is included.

Therefore, it can be seen that even when the fluorine-based non-ionic surfactant is used, a large diffusion distance is exhibited only when the binder is included in less than 10 wt %.

In addition, photographs comparing differences in impregnation of each of the separators of Example 2 and Comparative Example 6 are shown in FIG. 6.

Example 2 of FIG. 6 is the same photograph as Example 2 of FIG. 3, and FIG. 3 shows an average value of the diffusion distance in the MD direction and the diffusion distance in the TD direction of FIG. 6.

Referring to FIG. 6, the diffusion distance in the MD direction of Example 2 is 6.6 mm and the diffusion distance the TD direction of Example 2 is 5.5 mm, and the difference between them is about 1.2 times, and thus, it can be seen that the diffusion distance is exhibited in a symmetrical form based on the center of the TD direction and the center of the MD direction intersecting each other.

On the other hand, the diffusion distance in the MD direction of Comparative Example 6 is 2.0 mm and the diffusion distance the TD direction of Comparative Example 6 is 0.8 mm, and the difference between them is about 2.5 times, and thus, it can be seen that the diffusion distance is exhibited in an asymmetrical form based on the center of the TD direction and the center of the MD direction intersecting each other.

Meanwhile, in order to prepare battery cells including the separators of Example 3 and Comparative Example 12, a positive electrode including a nickel-cobalt-manganese-based positive electrode active material and a negative electrode including graphite as a negative electrode active material were prepared, and an electrode assembly was manufactured by interposing the separators between the positive electrode and the negative electrode.

After the electrode assembly was accommodated in a battery case, an electrolyte solution was injected to impregnate the electrode assembly in the electrolyte solution, and the battery case was sealed to manufacture a battery cell.

The cycle characteristics of the battery cells were measured, and the results are shown in FIG. 7.

The cycle characteristics measurement test shows the result of measuring about 180 times the process of charging a constant current/constant voltage at 0.8 C and high-rate discharging at 0.5 C.

Referring to FIG. 7, when the separator of Example 3 is included, it shows that the capacity retention rate is about 85% when charging and discharging is performed 150 times. However, when the separator of Comparative Example 12 is included, it shows that the capacity retention rate is about 72% when performing the same number of times.

Therefore, it can be seen that when the separator for a secondary battery according to the present invention is included, a significantly improved capacity retention rate can be secured.

Those skilled in the art to which the present invention pertains will appreciate that various applications and modifications are possible based on the above description, without departing from the scope of the present invention.

INDUSTRIAL APPLICABILITY

As is apparent from the above description, a separator for a secondary battery according to the present invention can improve wettability of a separator substrate by suppressing the generation of bubbles in a slurry configured to form a coating layer, and therefore it is possible to significantly improve the electrolyte impregnation.

It is possible to prevent the diffusion distance of the electrolyte from appearing asymmetry by controlling the amount of an acrylate-based binder included in a separator coating layer.

In addition, it is possible to reduce the resistance of the separator and to secure adhesion by lowering the density of the separator coating layer.

The invention claimed is:

1. A separator for a secondary battery, comprising:
   a separator substrate; and
   a coating layer on at least one surface of the separator substrate,
   wherein the coating layer comprises an acrylate-based binder and an additive,
   wherein the additive is a fluorine-based non-ionic surfactant,
   wherein an amount of the acrylate-based binder present is 10 wt % or less based on a total weight of solid content in the coating layer excluding the additive,
   wherein an amount of the fluorine-based non-ionic surfactant present is 0.001 wt % or less based on a total of an inorganic material and the acrylate-based binder in the coating layer, and
   a density of the coating layer is 2 $g/m^3$ or less.

2. The separator for the secondary battery according to claim 1, wherein the amount of the acrylate-based binder present is 5 wt % or less based on the total weight of solid content in the coating layer excluding the additive.

3. The separator for the secondary battery according to claim 1, wherein the separator is an aqueous separator.

4. The separator for the secondary battery according to claim 1, wherein a difference in a diffusion distance of an electrolyte in each of a machine direction (MD) and a transverse direction (TD) is within a range of 1.5 times, when 2 μl of the electrolyte is dropped.

5. The separator for the secondary battery according to claim 4, wherein an average diffusion distance of the separator is 2.0 mm/2 μl to 7.0 mm/2 μl.

6. The separator for the secondary battery according to claim 1, wherein the coating layer further comprises an inorganic material.

7. A battery cell comprising:
   an electrode assembly, wherein the separator for the secondary battery according to claim 1 is interposed between a positive electrode and a negative electrode.

8. The battery cell according to claim 7, wherein a capacity retention rate of the battery cell is 80% or more when the battery cell is charged and discharged 150 times.

9. A battery pack comprising the battery cell according to claim 7.

* * * * *